(12) United States Patent
Ricci et al.

(10) Patent No.: US 6,257,110 B1
(45) Date of Patent: Jul. 10, 2001

(54) TUBE SAW

(75) Inventors: Donato L. Ricci, W8477 - 162nd Ave., Hager City, WI (US) 54014; Martin A. Gardzinski, Red Wing, MN (US)

(73) Assignee: Donato L. Ricci, Hager City, WI (US)

( * ) Notice: Subject to any disclaimer, the term of this patent is extended or adjusted under 35 U.S.C. 154(b) by 0 days.

(21) Appl. No.: 09/496,366

(22) Filed: Feb. 2, 2000

(51) Int. Cl.$^7$ .................................................. B23B 5/14
(52) U.S. Cl. .............................. 82/113; 82/53.1; 82/131; 83/631
(58) Field of Search ............................ 82/113, 123, 131, 82/117, 53.1; 83/618, 622, 631

(56) References Cited

U.S. PATENT DOCUMENTS

| | | | |
|---|---|---|---|
| 4,791,842 | * 12/1988 | Olson | 82/113 |
| 4,813,314 | * 3/1989 | Kwech | 82/113 |
| 4,939,964 | * 7/1990 | Ricci | 82/113 |
| 5,189,933 | * 3/1993 | Ricci | 82/113 |
| 5,349,751 | 9/1994 | Fahr | 30/102 |
| 5,549,024 | 8/1996 | Ricci | 82/113 |
| 5,609,081 | * 3/1997 | Lin | 82/59 |
| 5,685,996 | * 11/1997 | Ricci | 219/121.39 |
| 5,993,963 | 8/1999 | Pierce | 30/97 |

* cited by examiner

Primary Examiner—Henry Tsai
(74) Attorney, Agent, or Firm—Nikolai, Mersereau & Dietz, P.A.

(57) ABSTRACT

A tube saw for precision cuts on tubing wherein a motorized circular saw is rotated about the circumference of a tube to cut it without leaving burrs, finishing marks or other deformations on the tubing. The tubing is held firmly and precisely by a plurality of facing triangular clamping elements and the clamping elements are centered and firmly locked in place relative the housing containing the saw to ensure the blade does not move relative the tube during the cut. The housing, rotatably holding the saw, has bearings with angular and radial stiffness to hold the saw firmly in position during the cut to ensure a high quality cut. A servomotor drives the rotatable portion of the housing at an even rate to cut the tubing with an even force and rate around its circumference. The saw is positioned close to the end of the clamping elements to limit bending and vibrations in the tubing from interfering with a square high precision cut. A radial feed control on the rotatable portion of the saw housing adjusts the radial displacement of the saw for cutting into the tube. The tube saw can be used on small tubing with high precision as well as larger tubes. The ability of the tube saw to hold the position of the tubing and the saw blade precisely while limiting vibrations in the tubing an the saw blade contribute to the high quality square cut provided by the tube saw.

9 Claims, 3 Drawing Sheets

TUBE SAW

BACKGROUND OF THE INVENTION

1. Field of the Invention

This invention relates to tube cutters having a clamping means and wherein the saw rotates around the tube while cutting it.

2. Description of the Related Art

In the past tube cutters have had motors with saw blades in rotatable housings which rotate the saw around the outside diameter of the tube to be cut. However, little attention was paid to making precision cuts such that the tube has a square cut with no burrs, finishing marks, or other imperfections. Making precision cuts is particularly a problem with smaller diameter tubes since they bend and vibrate easily.

Clamping devices hold the tubing in place during the cutting procedure. However, in the past these clamping devices did not hold the tubes straight enough or firmly enough to keep the tubes perpendicular to the saw to ensure a square cut with no burrs, finishing marks or other imperfections. Further the clamping devices did not sufficiently dampen vibrations in the tubing to prevent vibrational movements from reducing the quality of the cut.

In the past the rotatable housing of the saws did not rotate around the tube with precision. There was not sufficient stiffness of the bearings of the rotatable housings to hold the saw blade in a plane. Further the stiffness was not sufficient to dampen vibrations in the housing, which would then transfer to the saw blade. Both of these conditions lead to a cut, which is not square, leaves finishing marks, burrs and other imperfections in the cut.

In the past centering the tube axis to the left or right with respect to the center of rotation of the blade in the rotatable housing was accomplished by moving the clamping device left or right relative the housing, but the clamping device was not sufficiently secured to the housing to hold it solidly in place and prevent movement or vibrations from detracting form the quality of the cut.

Further, in the past, the tube saws were rotated on the housing by hand thus applying uneven pressures of the saw blades on the tubes. The uneven force of the blade on the tubing promotes causes different cut rates in different portions of the tube. The uneven force on the blade promotes different vibration patterns in the tubing and in the saw blade and forces the tubing out of alignment at different amounts such that it is no longer square with respect to the blade. The differences in pressures on the blade result in different cut qualities around the circumference of the tubing. It is desired to have a uniform precision cut around the circumference of the tubing.

SUMMARY OF THE INVENTION

The invention relates to a tube saw for precision cuts of tubing wherein the tube saw produces a square cut with no burrs, finishing marks or other defects.

The tube saw comprises a clamp with a plurality of alternately sloped triangular clamping elements having opposing complementary facing hypotenuse surfaces for gripping a tube along its length in a plurality of positions for aligning the tubes held therein perpendicular to a saw while damping vibrations in the tubing. The tubing center is adjusted by a centering shaft to compensate for the clamps not being aligned exactly with the center of the housings axis of rotation. The clamping means is then fixed in position relative the housing with T-nuts to ensure a square cut and to limit vibrations.

A rotating circular saw blade driven by a motor is mounted on a housing and radially adjusted to a depth for cutting into the tube such that the saw blade cuts though to the tube inner wall. Then the housing is rotated 360 degrees around the tubing allowing the saw to cut the tubing around its circumference. The rotating housing has bearings providing axial and radial stiffness such that the saw is held firmly in position as it rotates around the tube and the vibrations of the saw are dampened by the bearing stiffness.

A servo motor having a gear housing provides an evenly applied force to the gear teeth on the rotating portion of the housing to rotate the saw around the tube. The evenly applied force of the servo motor moves the saw at an even rate around the tube for application of a uniform cutting pressure of the saw blade on the tube producing a high quality cut around the entire tube.

OBJECTS OF THE INVENTION

It is an object of the invention to make square cuts on tubing.

It is an object of the invention to eliminate burrs on the cut tubing.

It is an object of the invention to eliminate finishing marks on the cut tubing.

It is an object of the invention to hold the tubing with a clamp to reduce vibrations in the tubing while it is being cut resulting in a better cut.

It is an object of the invention to hold the tubing with a clamp so that the tube axis is perpendicular with respect to the saw blade plane for a square cut.

It is an object of the invention to center the tubing with respect to the axis of rotation of the saw blade rotation, to lock the tubing in that location, and to dampen vibrations in the housing assembly such that the tubing will receive a square cut.

It is an object of the invention to position the saw blade close to the clamp to reduce, bending a vibration in the tubing for a better cut.

It is an object of the invention to rotate the saw around the tubing without movement of the saw away from the plane of the cut and to dampen vibration of the saw blade as it rotates around the tube for a better cut.

It is an object of the invention to provide even force on the saw as it rotates around the tube for less vibration in the tubing and an even cut of the tubing.

It is an object of the invention to dampen vibration in the housing during rotation of the saw blade around the tubing.

It is an object of the invention to provide stiff bearings in the housing.

Other objects, advantages and novel features of the present invention will become apparent from the following detailed description of the invention when considered in conjunction with the accompanying drawing.

DESCRIPTION OF THE PREFERRED EMBODIMENTS

Figure 1:
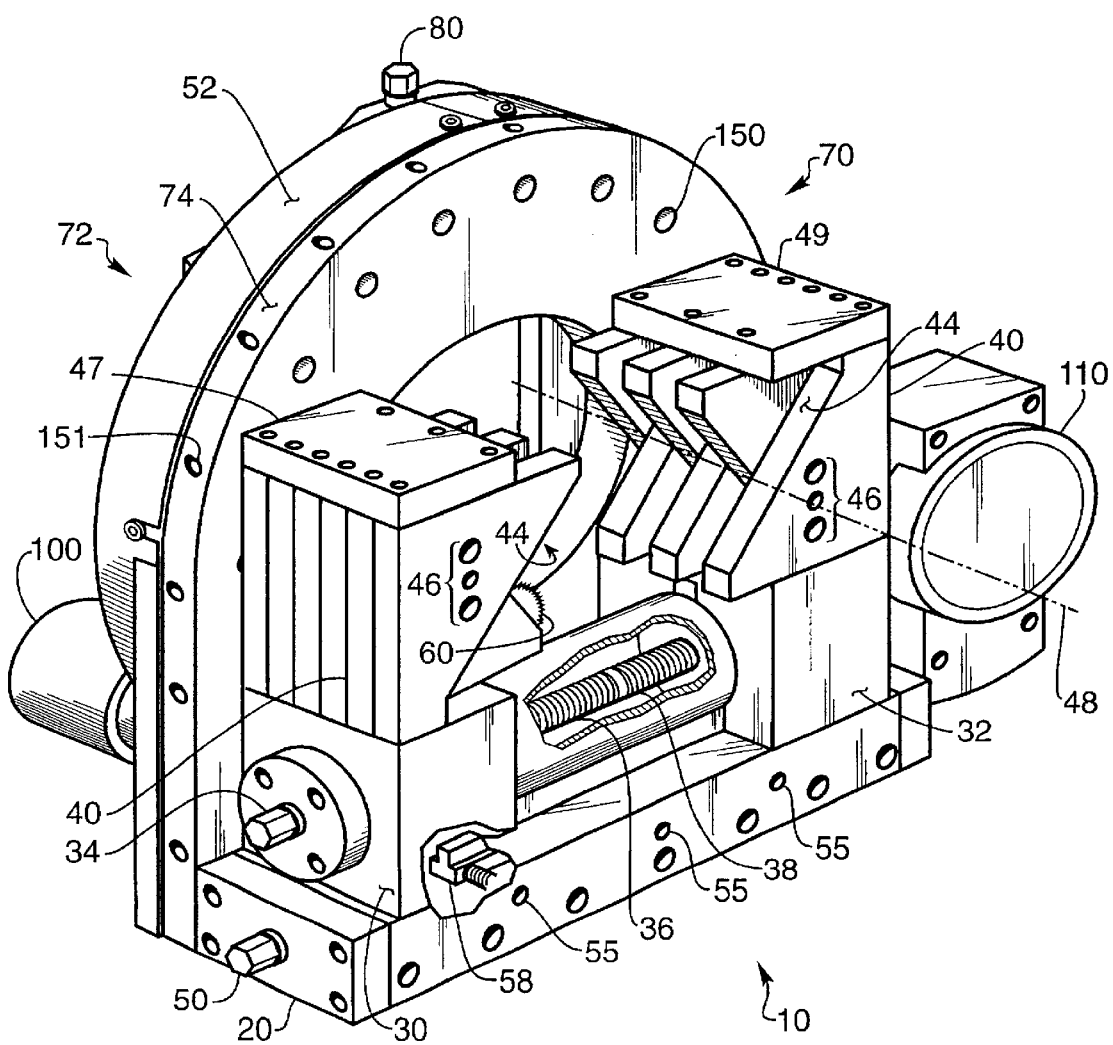
FIG. 1 is a front perspective view of the tube saw.

FIG. 1 is a front perspective view of the tube saw 10. Tube saw 10, has a base 20. Slidably mounted on the base 20 is a left tube clamp carrier 30 and a right tube clamp carrier 32. A counter threaded shaft 34 having left handed threads 36 on one side and right handed threads 38 on the other side engage threads in the left tube clamp carrier 30 and right tube clamp carrier 32 such that as the counter threaded shaft 34 is rotated in one direction the left tube clamp carrier 30 and a right tube clamp carrier 32 are moved towards each other and as the counter threaded shaft 34 is rotated in the opposite direction the left tube clamp carrier 30 and a right tube clamp carrier 32 are moved the away from each other.

Mounted on the tube clamp carrier 32, is a row of alternately facing 45 degree right triangular shaped clamp elements 40 wherein the hypotenuse of the first element 40 has a +45 degree slope and the adjacent element 40 has a −45 degree slope, and so on. Opposite the right triangular shaped clamp elements 40 on clamp carrier 30 is a similar row of right triangular shaped clamp elements having opposite slopes such that the two rows interdigitate when closed, the clamps having complementary facing sides to engage and hold tubes therebetween.

The rows of clamp elements 40 are bolted together with bolts in alignment holes 46 such that they are solidly fixed in position and aligned such that a V shaped tube engaging apex 48 line is formed in a fixed position even with the height of the center of the housing axis of rotation. The clamp elements 40 are secured at the top by plates 47 and 49 ensuring clamp element 40 alignment. The opposite rows of clamp elements 40 are oriented inversely so that the clamp elements 40 interdigitate when closed securing a tube held therebetween against each hypotenuse surface 44 near the apex 48. With a plurality of opposing clamp elements 40 the tubes held therein are secured at a plurality of locations along their length ensuring alignment of the tube axis perpendicular to the saw blade 60. The plurality of engagement points also helps dampen vibrations while ensuring a number of engagement points firmly held in a straight line for accuracy of alignment. The engagement points are just above and just below the apex 48 helping to stabilize the tube height.

The height of the tubing is assured by the apex 48 formed by the clamp elements being of uniform height on tube clamp carriers 30, 32 both of which are attached to base 20. A centering mechanism aligns lateral movement of the axis of the tubing with respect to the axis of rotation of the saw. Lateral adjustment is required since the counter threaded shaft 34 can not be relied on to perfectly center the left and right tube clamp carriers 30 and 32 respectively. The misalignment is due to the differences in threading on the counter threaded shaft 34 and uneven shaft lengths on either side of counter threaded shaft 34. Therefore threaded centering shaft 50 adjusts the center point of the tubes left or right on the base 20 by rotating the centering shaft 50 clockwise or counter clockwise. Both clamp carriers 30 and 32 rest on the centering mechanism Once the centering is accomplished for a given diameter tube, a series of set screws 55 are tightened on a T nut 58 running the length of the base 20 to ensure the tube is fixed in its centered position. The T nut 58 and set screws 55 also ensure that vibrations in the housing are dampened.

Figure 2:
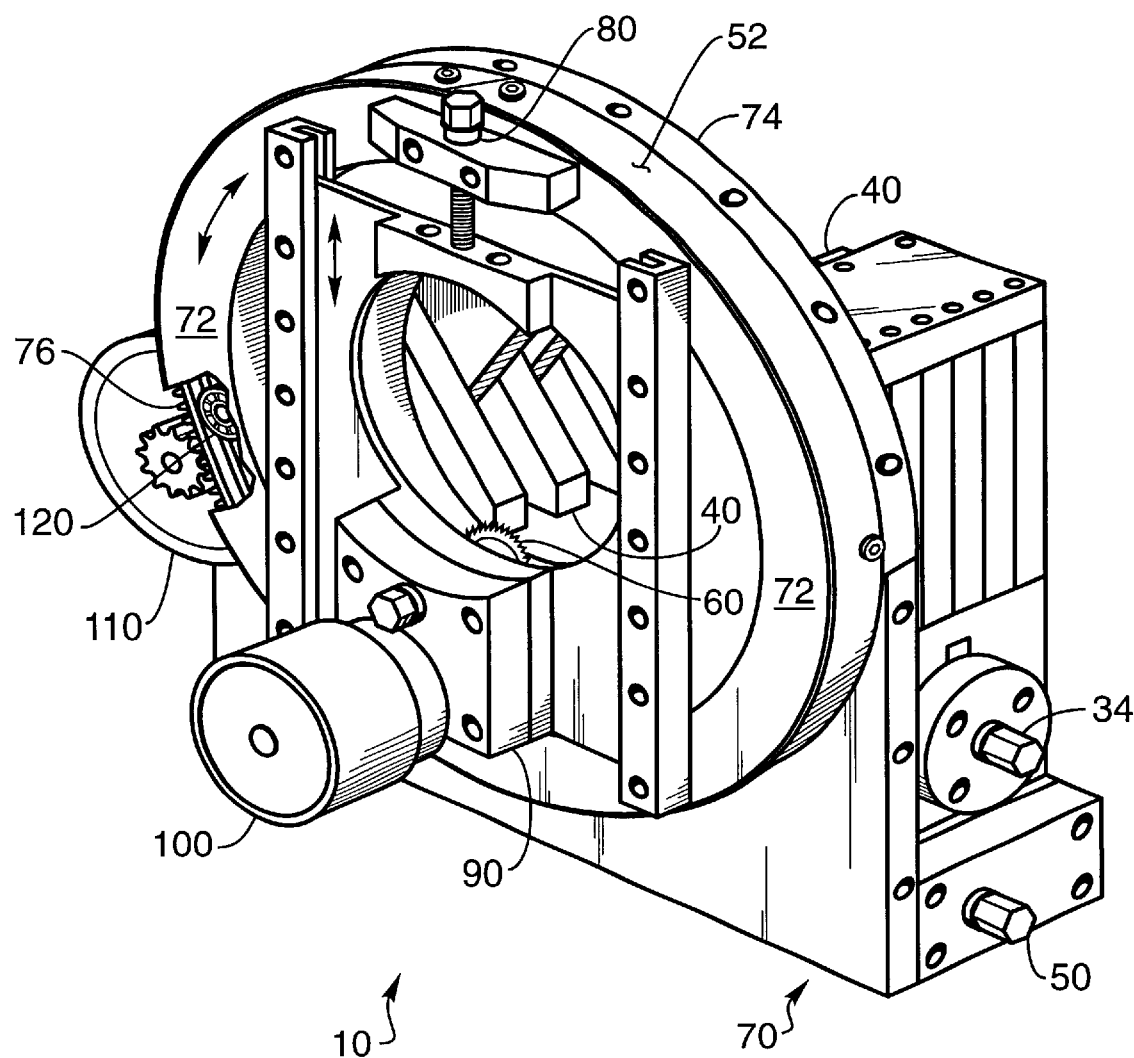
FIG. 2 is a rear perspective view of the tube saw.

FIG. 2 shows the rear view of the tube saw 10. Saw blade 60 is rotatably fixed in housing 70. Housing 70 has a fixed portion 74 attached to the base 20 of the clamping means and a rotatable portion 72 attached to the saw 60 for rotating the saw 60 around the tube. When a tube is clamped in the tube saw 10 the saw blade 60 is rotated by motor 100 and the saw blade 60 is then adjusted by radial feed control 80 to raise and lower saw housing 90. With the housing 70 stationary the saw blade 60 is adjusted radially to engage the tube and cut through the outer diameter to the inner diameter. The housing rotatable portion 72 then rotates 360 degrees around the circumference of the tube for cutting it. The rotatable housing 72 is propelled by servomotor 110 at an even speed and even pressure to cut the tube without leaving burrs, finishing marks, or other imperfections. The saw 60 is preferably very close to the clamp elements 40 such that the tube will not be bent much by the pressure of the saw 60 on the tube. The closeness of the saw 60 to the clamp elements 40 also helps dampen vibrations, which are deleterious to the quality of the cut.

Figure 3:
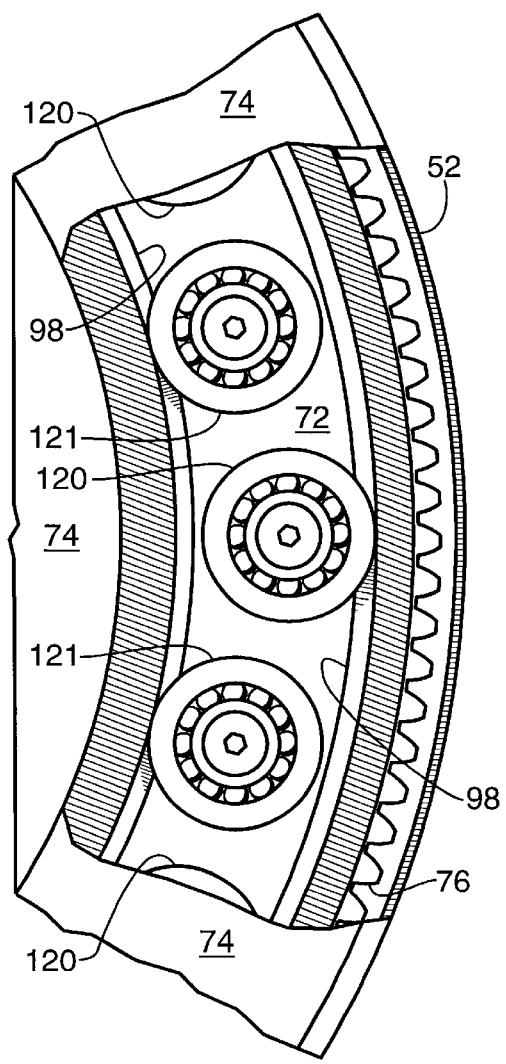
FIG. 3 is a side view of the eccentric bearings in a housing.

The saw blade 60 must be held firmly by the housing 70 and rotated steadily and smoothly for a square cut. The stiffness of the bearings in the housing dampens vibrations and movement of the saw blade 60 relative the tube for a high quality cut. In order to hold the housing 70 stiffly in the radial direction the bearings 120, 121 are alternately radially offset. As shown in FIG. 3 one bearing 120 is offset toward the fixed housing portion 74 to hold it stiffly in the radial direction and the next bearing 121 is offset toward the rotating housing portion 72 to hold it stiffly in the radial direction. The ring gear 76, attached to the rotating housing portion 72, engages a gear on the servomotor 110 for rotating the rotating housing portion 72 and hence saw blade 60 to cut the tube around its circumference. The saw blade 60 is therefore firmly held in the radial direction to promote a clean square cut.

Figure 4:
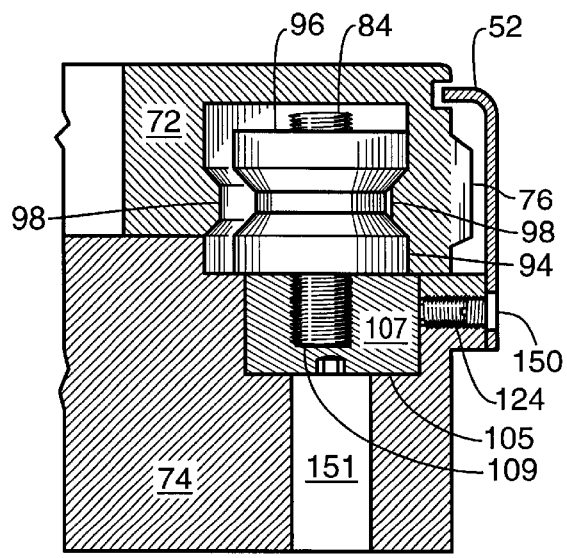
FIG. 4 is a cross sectional view of an eccentric bearing in a housing with a center protuberance on the housing and a V shaped bearing.

The radial position of each bearing 120, 121 can be adjusted. As shown in FIG. 4 a cylindrical cam 107 has a threaded bore 109 offset from the center into which is screwed the stud 84 of the bearing 120, 121. When the cylindrical cam 107 is rotated in cam well 105 the eccentricity of the threaded bore 109 adjusts the radial distance of the bearing 120, 121. When a desired position for the bearing 120, 121 is established, it is locked in place by a set screw 124 which are accessed by apertures 150 in the fixed housing portion 74.

Figure 5:
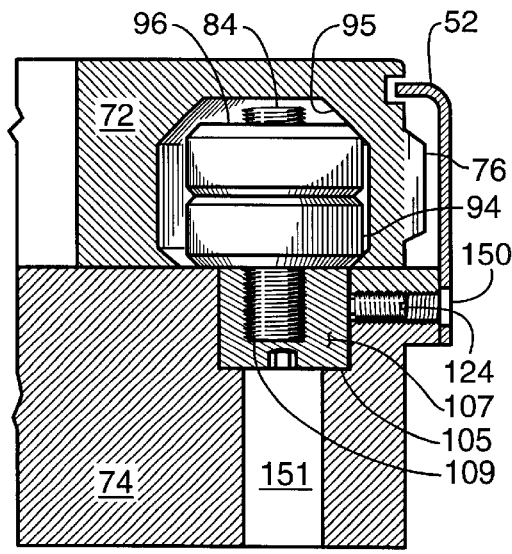
FIG. 5 is a cross sectional view of an eccentric bearing in a housing with a sloped race wall and sloped bearing sides.

The axial movement of the rotating housing portion 72 is controlled by the bearings axial stiffness as shown in FIGS. 4 and 5. In FIG. 4 the axial limitation of movement is controlled by the rotating housing portion 72 having an annular protuberance of a truncated isosceles triangle 98 combined with upper and lower roller bearing 96, 94 both inwardly beveled as shown to form a V-notch to engage the annular protuberance 98. Thus the saw blade 60 is prevented from axial movement. The resultant saw alignment with the tubing is kept square and the vibrations of the housing reduced producing a cut with no burrs, finishing marks, or other imperfections.

In an alternative design of FIG. 5 the upper roller bearing 96 and a lower roller bearing 94 are reversed such that instead of a V shaped groove formed between them the angled portion 93 of the bearings is facing outward matching a similarly angled race wall 95 in the rotating housing portion 72.

For a more detailed presentation of the bearing and housing assembly see the applicant's issued U.S. Pat. No.

5,549,024 issued Aug. 27, 1996 entitled CLAMSHELL PIPE LATHE HAVING IMPROVED BEARING ARRANGEMENT which is hereby made a part hereof and incorporated herein by reference.

Obviously, many modifications and variations of the present invention are possible in light of the above teachings. It is therefore to be understood that, within the scope of the appended claims, the invention may be practiced otherwise than as specifically described.

What is claimed is:

1. A tube saw comprising:

a housing having a fixed portion and a rotatable portion, the housing having an opening therein, a tube clamping device having two opposing linear arrays of tube clamping elements, each array having tube clamping elements with alternating sloped surfaces, attached to the fixed housing portion, wherein the opposing linear arrays have complimentary slopes for securely holding a tube in multiple places ensuring the holding of the tube perpendicular to the opening in the housing when the opposing arrays are drawn together, a saw attached to the rotatable portion of the housing, such that the saw is radially adjustable and rotates on an axis around the opening in the housing, a plurality of bearings for rotatably connecting the fixed housing portion to the rotatable housing portion, the bearings providing axial and radial stability as the saw rotates around the tube, the rotatable housing portion having an inner bearing race and an outer bearing race, the bearings are attached to the fixed housing portion and selectively have a means for radially adjusting the position of the bearings inwardly to engage the inner bearing race and outwardly to engage the outer bearing race, with varying degrees of force, to provide varying degrees of stiffness between the rotatable housing portion and the fixed housing portion thus providing accurate radial positioning of the saw relative the tube, a servomotor having a worm gear connected thereto, attached to the fixed housing portion for engaging and driving, a ring gear on the rotatable housing portion for rotating the rotatable housing portion such that the saw cuts the circumference of the tube held in the clamping device.

2. A tube saw as in claim 1 wherein, the tube clamping device has a first plurality of triangular clamping elements aligned linearly with alternately sloped hypotenuse faces for engaging the tube, facing a second plurality of triangular clamping elements aligned with alternately sloped hypotenuse faces for engaging the tube wherein the slope of the facing first and second plurality of triangular clamping elements are opposite and the triangular clamping elements interdigitate to close on and hold the tubes in place at a plurality of sloped hypotenuse faces such that the tubes are held firmly perpendicular to the saw.

3. A tube saw as in claim 2 wherein, the tube clamping device has a base attached to the fixed housing portion, a first tube clamp carrier having threads therein adjustably attached to the base and a second tube clamp carrier having threads therein adjustably attached to the base, a counter threaded shaft for threadedly engaging both the first and second tube clamp carriers simultaneously such that rotation of the counter threaded shaft in one direction draws the first and second clamp carriers together and rotation of the counter threaded shaft in the opposite direction moves the first and second clamp carriers apart.

4. A tube saw as in claim 3 wherein, the base has a threaded centering shaft for adjusting the position of the first and second tube clamp carriers to center the tube at the axis of rotation of the housing and a locking means for fixing the first and second tube clamp carriers relative to the base and dampening vibrations therebetween.

5. A tube saw as in claim 4 wherein, the locking means for fixing the first and second tube clamp carriers is a T-nut in the base secured by a plurality of screws.

6. A tube saw as in claim 1 wherein, the means for radially adjusting the position of the bearings including a cam well in the fixed housing portion, a cylindrical cam rotatably housed in the cam well, a bearing attachment point on the cylindrical cam which is off center such that as the cylindrical cam rotates in the cam housing the bearing attachment point moves closer to the inner or outer bearing race, a means for attaching the bearing to the bearing attachment point.

7. A tube saw as in claim 1 wherein, a means for limiting axial movement of the fixed housing portion relative to the rotatable housing portion for providing a fixed position of the saw blade along the length of the tube and limiting axial vibration between the fixed housing portion and the rotatable housing portion.

8. A tube saw as in claim 7 wherein, the means for limiting axial movement of the fixed housing portion relative to the rotatable housing portion includes an annular protuberance on the rotatable housing portion which engages a V shaped notch in the bearing such that the bearing prevents axial movement of the rotatable housing portion relative the fixed housing portion of the housing.

9. A tube saw as in claim 7 wherein, the means for limiting axial movement of the fixed housing portion relative to the rotatable housing portion includes an inner and outer angled wall in the rotatable housing portion for engaging an angled inner and outer portion of a bearing thus limiting the rotatable housing movement axially.

* * * * *